Feb. 8, 1966  H. LUDWIG  3,233,285
INJECTION MOLD PLANT ASSEMBLY
Original Filed May 4, 1962  2 Sheets-Sheet 1

INVENTOR.
HERBERT LUDWIG
BY
Michael J. Strike
ATTORNEY

Feb. 8, 1966 H. LUDWIG 3,233,285
INJECTION MOLD PLANT ASSEMBLY
Original Filed May 4, 1962 2 Sheets-Sheet 2

INVENTOR.
HERBERT LUDWIG
BY
Richard S. Striker
ATTORNEY

United States Patent Office 3,233,285
Patented Feb. 8, 1966

3,233,285
INJECTION MOLD PLANT ASSEMBLY
Herbert Ludwig, Desmastrasse 112,
Uesen, near Bremen, Germany
Original application May 4, 1962, Ser. No. 192,397, now Patent No. 3,184,030, dated May 18, 1965. Divided and this application Nov. 12, 1963, Ser. No. 322,723
Claims priority, application Germany, May 8, 1961, D 36,014
9 Claims. (Cl. 18—4)

The present invention relates to an apparatus for intermittently moving a series of items in an endless path, and more particularly to an apparatus which is especially suited for consecutively moving molds into operative engagement with an injection molding machine. For example, the apparatus of this invention may be utilized in mass manufacture of shoes and other articles of footwear wherein the soles are molded onto the uppers.

This application is a division of my copending patent application Ser. No. 192,397, filed May 4, 1962, now Patent No. 3,184,030 entitled Apparatus for Intermittently Moving a series of Items in an Endless Path.

In mass manufacturing of articles of footwear which are provided with plastic soles, it is customary to mount a series of molds and lasts on a rotary turntable and to intermittently rotate the turntable so that the molds are consecutively moved into alignment with a molding machine which injects plastic material into that mold which is momentarily aligned therewith. A serious drawback of such apparatus is that they occupy too much space or that they require such space which is frequently unavailable in shoe producing plants. In addition, it is practically impossible to accommodate a very large number of molds on a turntable without unduly increasing the diameter of the turntable so that it is often necessary to utilize two smaller apparatus as a substitute for a single apparatus of large capacity.

Accordingly, it is an important object of the invention to provide an improved apparatus for mass manufacture of articles of footwear with molded soles which can accommodate an exceptionally large number of molds in a comparatively small area and which is constructed and assembled in such a way that the width of the space in which the apparatus is accommodated can be much less than the length thereof.

Another object of the invention is to provide an apparatus of the just outlined characteristics in which the molds may be arranged in immediate proximity to and in actual abutment with each other so that the apparatus may accommodate an exceptionally large number of molds.

A further object of the invention is to provide an apparatus of the above described type in which the molds need not be permanently installed so that each mold is readily removeable for the purposes of inspection, cleaning or repair.

An additional object of the invention is to provide a very simple and compact arrangement for transferring molds between the ends of two mold-supporting conveyors.

Still another object of the invention is to provide an apparatus which, even though especially suited for moving a series of molds, may be utilized with equal advantage for intermittently moving items other than molds and which is especially suited for moving comparatively heavy and bulky items.

A concomitant object of the invention is to provide an apparatus of the above outlined characteristics in which the items may be moved in a fully automatic way.

A further object of the invention is to provide an apparatus of the above outlined characteristics in which the number of items which are to be moved in an endless path may be increased or reduced without necessitating changes in the dimensions of the apparatus in more than a single direction.

With the above objects in view, the invention resides in the provision of an apparatus which comprises a pair of elongated conveyers each of which supports a row of molds or other items so that the items are arranged end-to-end and that pressure exerted against one outermost item at one end of a conveyer causes the other outermost item to advance beyond the other end of the same conveyer, a pair of transfer devices which are respectively movable between the first and second ends of the conveyers so that they may be alternately aligned with the one and with the other conveyer, at least one additional item on one of the transfer devices, means for moving the transfer devices between the two conveyers, first shifting means for transferring a mold supported by one of the transfer devices onto one of the conveyers and for thereby moving an item off the one conveyer and onto the other transfer device, and second shifting means for moving an item supported by the other transfer device onto the other conveyer so that one item in the row of items supported by the other conveyer is transferred onto the one transfer device.

The novel features which are considered as characteristic of the invention are set forth in particular in the appended claims. The invention itself, however, both as to its construction and its method of operation, together with additional objects and advantages thereof, will be best understood from the following detailed description of a specific embodiment with reference to the accompanying drawings, in which:

Figure 1:
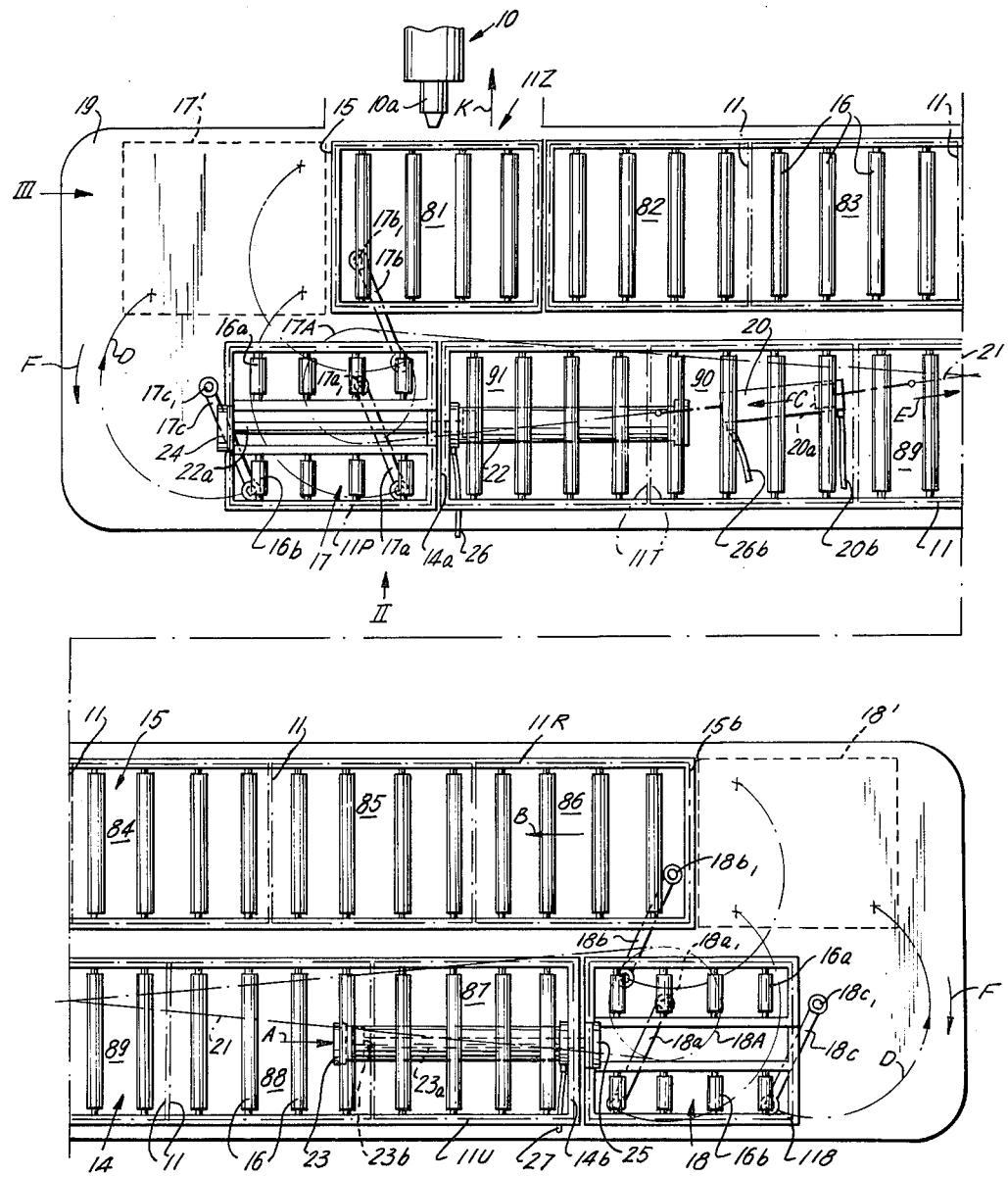
FIG. 1 is a schematic top plan view of an apparatus which embodies my invention.

Referring now in greater detail to the illustrated embodiment, and first to FIG. 1, there is shown an apparatus for intermittently moving a plurality of items 11 in an endless path and for moving consecutive items into operative engagement with a machine 10. It is assumed that the items 11 constitute molds in which soles are molded onto the uppers of shoes or other articles of footwear, and the machine 10 is assumed to be an injection molding machine. Each mold 11 comprises a block 12 (see FIG. 2) which defines a mold cavity (not shown), and a last 13 on which the the upper of an article of footwear is supported during a molding operation. In order to increase the output of the apparatus, it is often preferred to utilize pairwise arranged shoe lasts of the type disclosed, for example, in my copending applications Ser. Nos. 155,245 and 173,481 now Patent No. 3,109,200 to which reference may be had if necessary.

The apparatus comprises a pair of elongated conveyers 14, 15 which are preferably adjacent to and parallel with each other. Each of these conveyers comprises a plurality of mold-supporting rollers 16 whose axes are perpendicular to the longitudinal directions of the conveyers and on which the molds 11 are supported in end-to-end relation so that pressure exerted against the one outermost mold 11 on the conveyer 14 or 15 causes the entire row of molds to move in the longitudinal direction of the respective conveyor, and that the other outermost mold is actually pushed off the respective conveyer. In FIG. 1, the molds 11 are indicated in phantom lines for the sake of clarity. For example, if the outermost mold 11R at the right-hand end 15b of the conveyer 15 is moved in a direction to the left, as viewed in FIG. 1 (arrow B), the intermediate molds 11 will move automatically in the same direction because they are arranged end-to-end, whereby the outermost mold 11Z will be pushed beyond the left-hand end 15a of the conveyer 15. Each conveyer supports a full row of molds which extend from the one to the other end thereof. It is assumed that the row of molds supported by the conveyer 14 moves intermittently in a direction to the right (arrow A) and that the row of molds supported by the conveyer 15 moves in the opposite direction (arrow B). The longitudinal ends of the conveyer 14 are identified by reference numerals 14a, 14b.

The apparatus of my invention further embodies a pair of transfer devices 17, 18 each of which comprises two series of rollers 16a, 16b. The axes of the rollers 16a, 16b are parallel with the axes of the rollers 16, and the transfer device 17 is movable in parallelism with itself between the left-hand ends 14a, 15a so that it alternately aligned with the conveyers 14 and 15. The other transfer device 18 is movable between the ends 14b, 15b into alternate alignment with the conveyers 14 and 15 so that it may deliver a mold from the conveyer 14 to the conveyer 15. The purpose of the transfer device 17 is just the opposite, i.e. this device transfers molds from the end 15a of the conveyer 15 to the end 14a of the conveyer 14. The arrangement is such that the transfer devices are preferably movable simultaneously into alignment with the respective ends of the conveyer 14 (this position of the transfer devices is shown in FIG. 1 in full lines) and thereupon into alignment with the respective ends of the conveyer 15 (this position of the transfer devices is shown in FIG. 1 in broken lines at 17', 18', respectively).

Figure 2:
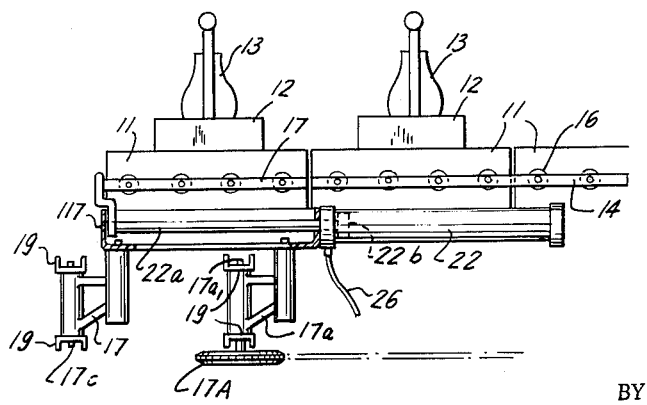
FIG. 2 is a fragmentary side elevational view of the apparatus as seen in the direction indicated by the arrow II in FIG. 1.

The means for moving the transfer devices 17, 18 into alignment with the conveyers 14 and 15 is shown in part in FIG. 1 and in part in FIG. 2 of the drawings. The transfer device 17 comprises a rectangular frame or platform 117 which carries the aforementioned rollers 16a, 16b and which is articulately connected with three rockable arms 17a, 17b, 17c. These arms are respectively rockable about the axes of fixed vertical shafts $17a_1$, $17b_1$, $17c_1$ which are mounted in frame members of the base 19. The other transfer device 18 comprises a frame 118 which supports the rollers 16a, 16b and which is articulately connected with three rockable arms 18a, 18b, 18c. These arms are respectively rockable about the axes of fixed vertical shafts $18a_1$, $18b_1$, $18c_1$ which are mounted in frame members of the base 19.

In accordance with a feature of my invention, the means for rocking the arms 17a–17c and 18a–18c comprises a first pulley 17A which is drivingly connected with the shaft $17a_1$, a second pulley 18A which is drivingly connected with the shaft $18a_1$, a flexible element in the form of chain 21 which is trained around the pulleys 17A, 18A, and a double acting cylinder 20 which is mounted in the base 19 and which accommodates a reciprocable piston 20a. The spaced portions of the chain 21 which are trained around the pulleys 17A, 18A are turned through 180 degrees with respect to each other so that the pulley 17A rotates in a clockwise direction when the pulley 18a rotates in an anticlockwise direction, or vice versa. The ends of the cable 21 are connected with the opposite sides of the piston 20a; therefore, the pulley 17A will rotate in a clockwise direction when the piston 20a is caused to move in a direction to the left, as viewed in FIG. 1 (arrow C), whereby the transfer device 17 is moved in parallelism with itself and is shifted from the end 14a of the conveyer 14 to the end 15a of the conveyer 15. At the same time, the pulley 18A will rotate in an anticlockwise direction to shift the transfer devices 18 from the end 14b to the end 15b. The cylinder 20 is connected with two conduits 20b, 20c which lead to a source of hydraulic or pneumatic pressure fluid (not shown). Suitable regulating valve means is provided for selectively admitting presure fluid at the opposite sides of the piston 20a so that the conduit 20c may permit outflow of fluid from the left-hand chamber of the cylinder 20 when the conduit 20b admits pressure fluid and vice versa. It will be readily understood that the shafts $17a_1$, and $18a_1$ are drivingly connected with the respective arms 17a, 18a whereas the arms 17b, 17c and 18b, 18c may turn about the respective shafts $17b_1$, $17c_1$ and $18b_1$, $18c_1$.

The rollers 16a, 16b of the transfer device 17 are assumed to support a mold 11P which is momentarily aligned with the outermost mold 11T at the left-hand end 14a of the conveyer 14. The transfer device 18 is unoccupied and is adjacent to the outermost mold 11U at the right-hand end 14b of the conveyer 14.

In accordance with another feature of my invention, each transfer device is provided with a shifting means which is adapted to transfer a mold onto one of the conveyers 14, 15. The arrangement is such that the shifting means associated with the transfer device 17 is adapted to transfer a mold (e.g. the mold 11P) onto the conveyer 14 so that the mold 11P pushes against the mold 11T and moves the entire row of molds supported by the conveyer 14 in a direction to the right, as viewed in FIG. 1 (arrow A), whereby the mold 11U is transferred onto the rollers 16a, 16b of the right-hand transfer device 18. The shifting means which is associated with the transfer device 18 operates in the opposite direction, i.e. after the mold 11U is transferred onto the device 18 and after this device is moved into alignment with the right-hand end 15b of the conveyer 15, the associated shifting means transfers the mold 11U onto the conveyer 15 by pushing against the mold 11R and by advancing the entire row of molds on the conveyer 15 in a direction to the left (arrow 3), whereby the mold 11Z is transferred onto the device 17.

The shifting means associated with the transfer device 17 comprises a single-acting cylinder 22 which is mounted in the frame 117 and which accommodates a reciprocable piston 22b. This piston is connected to a piston rod 22a which carries at its outer end a motion transmitting lug 24, the latter reciprocable in the longitudinal direction of the conveyers 14, 15 and movable between the rollers 16a, 16b of the device 17 so that, when it assumes the position of FIGS. 1 and 2 and when a pressure fluid is admitted through a conduit 26 which communicates with the left-hand chamber of the cylinder 22, the piston 22b will move in a direction to the right and will entrain the piston rod 22a with the lug 24 in order that the lug may advance the mold 11P onto the conveyer 14 and that the mold 11P may cause the mold 11U to advance onto the transfer device 18. On the other hand, when the transfer device 17 is aligned with the conveyer 15, when the lug 24 is adjacent to the end 15a, and when a mold supported by the transfer device 18 is moved onto the right-hand end portion of the conveyer 15, the mold 11Z will push the lug 24 in front of it and will return this lug to the left-hand end of the transfer device 17 so that the lug 24 is in proper position for subsequent transfer of the mold 11Z onto the left-hand end portion of the conveyer 14.

The shifting means which is associated with the transfer device 18 comprises a second single-acting cylinder 23 whose piston 23b is connected with a piston rod 23a, and the latter carries at its outer end a second motion transmitting means in the form of a lug 25. The cylinder 23 is connected with a supply conduit 27 which selectively admits or permits evacuation of pressure fluid from the cylinder chamber at the right-hand side of the piston 23b. The arrangement is such that the piston 22b automatically expels fluid from the cylinder 22 when the conduit 27 admits fluid to the cylinder 23, and vice versa. For example, if fluid is admitted through the conduit 26 and the piston 22b moves in a direction to the right (arrow A) to entrain the lug 24, the lug 24 transfers the mold 11P onto the left-hand end portion of the conveyer 14 and thereby advances the mold 11U against the lug 25 so that this lug 25 causes the piston 23b to expel fluid through the conduit 27 because the piston 23b is compelled to move from the left-hand to the right-hand end of the cylinder 23, as viewed in FIG. 1 (arrow A). The conduit 26 is connected to that end of the cylinder 22 which is nearer to the transfer device 17, and the conduit 27 communicates with that portion of the cylinder 23 which is nearer to the transfer device 18. It will readily be understood that the conduits 26, 27 may be connected with a suitable distributor valve which automatically admits pressure fluid to the conduit 26 when the conduit 27 is permitted to evacuate fluid from the cylinder 23, and vice versa. Since such types of valves are well known, they are not shown in the drawings. The outflow of fluid from the cylinders 22, 23 is preferably throttled so that the pistons 22b, 23b meet some resistance when they expel fluid; this is advisable because the motion transmitting lugs 24, 25 are then free of rattling and always assume positions in which they are ready to engage or to be engaged by the molds 11.

In the illustrated embodiment, the apparatus of my invention is assumed to accommodate twelve molds. The six stations 81–86 of the conveyer 15 are occupied by the leftmost mold 11Z, by the four intermediate molds 11, and by the rightmost mold 11R. The five stations 87–91 of the conveyer 14 are occupied by the rightmost mold 11U, by the three intermediate molds 11, and by the leftmost mold 11T. In addition, the apparatus comprises the aforementioned mold 11P which is supported by the rollers 16a, 16b of the transfer device 17.

The manner in which the apparatus of my invention advances the molds in an endless path is as follows:

Since the transfer device 17 supports a mold (11P), the left-hand motion transmitting lug 24 is located at the left-hand end of this transfer device, i.e. the piston 22b is located at the left-hand end of the cylinder 22. The mold 11P abuts against the lug 24 but the transfer device 18 is unoccupied, i.e. the lug 25 is located at the left-hand end of the device 18 adjacent to the end 14b of the conveyer 14, which means that the piston 23b is located at the left-hand end of the cylinder 23.

In the first step, the conduit 26 admits pressure fluid to the left-hand chamber of the cylinder 22 so that the piston 22b is caused to move in a direction to the right, as viewed in FIG. 1 (arrow A), and that the lug 24 advances the mold 11P into the station 91 whereby the row of molds on the conveyer 14 is shifted to the right and the right-most mold 11U is advanced onto the transfer device 18. At the same time, the mold 11U causes the lug 25 to move from the left-hand end to the right-hand end of the transfer device 18, and the piston 23b automatically expels fluid from the cylinder 23. The mold 11P is now located at the station 91, the mold 11U is supported by the rollers 16a, 16b of the transfer device 18, and the transfer device 17 is unoccupied. Of course, it is assumed that the conduit 27 was sealed from the source of pressure fluid before the conduit 26 begins admitting fluid to the cylinder 22.

In the next step, the conduit 20b admits pressure fluid to the right-hand chamber of the cylinder 20 so that the piston 20a is caused to move in a direction to the left, as viewed in FIG. 1 (arrow C), and rotates the pulley 17A in a clockwise direction whereby the arms 17a–17c move the device 17 from the end 14a to the end 15a (arrow D) so that the transfer device 17 is now aligned with the conveyer 15 and is adjacent to the station 81. At the same time, the chain 21 rotates the pulley 18B in an anticlockwise direction to move the transfer device 18 from the end 14b to the end 15b (arrow D') so that the device 18 is adjacent to the station 86. The mold 11U is now adjacent to the mold 11R.

In the third step, the control system of the apparatus admits pressure fluid through the conduit 27 so that the lug 25 is caused to move in a direction toward the conveyer 15 (arrow B) and entrains the mold 11U into the station 86 whereby the mold 11Z is automatically advanced onto the transfer device 17, the latter being assumed to occupy the broken-line position 17'. As the mold 11Z moves onto the transfer device 17, it advances the lug 24 in a direction to the left and causes the piston 22b to expel fluid from the cylinder 22 through the conduit 26. The transfer device 18 is now unoccupied and the apparatus is in a position to move the transfer devices 17, 18 back into alignment with the respective ends of the conveyer 14 (arrows F, F') to repeat the operation in the above described sequence, i.e. the mold 11Z is transferred onto the conveyer 14, the mold occupying the station 87 is transferred onto the device 18, the devices 17, 18 are again moved into alignment with the ends of the conveyer 15, and so forth. When the devices 17, 18 are moved from the positions 17', 18' back into alignment with the conveyer 14, the cylinder 20 receives pressure fluid through the conduit 20c whereas the conduit 20b discharges fluid from the right-hand chamber of the cylinder 20, i.e. the piston 20a is caused to move in the direction indicated by the arrow E.

In accordance with a further feature of my invention, the apparatus comprises means for reciprocating a given mold, e.g. that mold which momentarily occupies the station 81, into operative engagement with the molding machine 10 and thereupon back onto the conveyer 15. In the position of the molds as shown in FIG. 1, the mold 11Z is about to be moved in a direction substantially perpendicular to the longitudinal direction of the conveyer 15 (arrow K) so that its plastic-admitting opening may receive the injection nozzle 10a of the machine 10, whereupon the molding operation is carried out and completed before the mold 11Z is returned to the position of FIG. 1.

Figure 3:
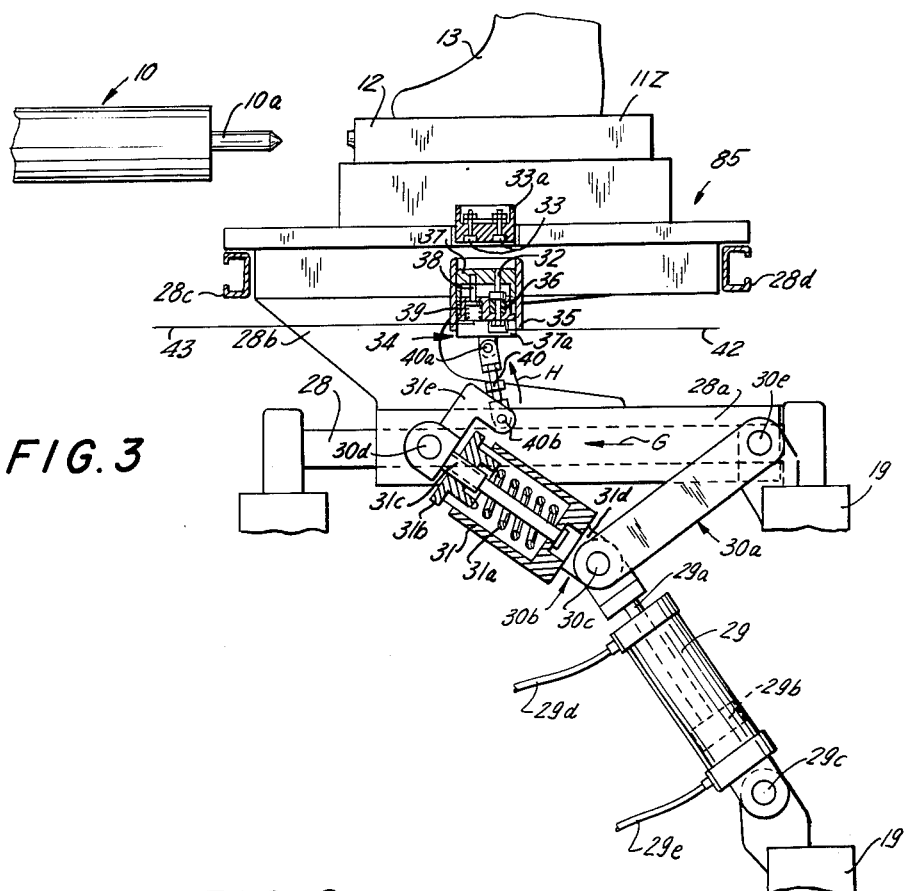
FIG. 3 is a greatly enlarged fragmentary end elevational view of the apparatus as seen in the direction indicated by the arrow III in FIG. 1.

The means for reciprocating the mold 11Z into engagement with and away from the machine 10 is shown in FIG. 3. This reciprocating means comprises guide means including rails or rods 28 which are perpendicular to the longitudinal direction of the conveyer 15 and which support a carriage 28a, the latter forming part of the conveyer 15 and being movable back and forth along the guide means 28. The carriage 28a supports a series of rollers 16 on which the mold 11Z may slide when engaged by the mold occupying the station 82. The carriage 28a is reciprocable by a double-acting fluid-operated cylinder 29 which is pivotally secured to the base 19, as at 29c, and which accommodates a reciprocable piston 29b connected to a piston rod 29a. The chambers at the opposite sides of the piston 29b may receive or discharge a pressure fluid through conduits 29d, 29e. The piston rod 29a is connected to a toggle mechanism including a first toggle lever 30a which is pivotally secured to the frame 19 by a pin 30e and which is also pivotally secured to the piston rod 29a by a second pin 30c, and a spring-biased second toggle lever 30b which is secured to the piston rod 29a by the aforementioned pin 30c and which is also secured to the platform 28a by a further pivot pin 30d. The toggle lever 30b is a composite structure and comprises a shock absorber including a housing 31 which accommodates a helical expansion spring 31a. The bias of the spring 31a may be adjusted by a threaded plug 31b which meshes with a bolt 31c, the latter secured to the pivot pin 30d and having a head which is adjacent to the outer side of the bottom wall forming part of the housing 31. The spring 31a operates between the bottom wall of the housing 31 and the plug 31b, and the portion 30d of the lever 30b is fulcrumed on the pin 30c.

FIG. 3 illustrates the mold 11Z in a position in which it is aligned with the remaining molds supported by the conveyer 15. When the mold 11Z is to move into operative engagement with the machine 10, fluid is admitted through the conduit 29e so that the piston 29b expels the piston rod 29a and the latter, together with the lever 30a, causes the lever 30b to move the carriage 28a in a direction to the left (arrow G) until the opening leading to the mold cavity of the mold 11Z receives the nozzle 10a. In this position of the carriage 28a, the toggle mechanism 30a, 30b is self-locking because the pivot pin 30c is then aligned with or is located at a level above the pivot pins 30d, 30e. The carriage 28a is returned to the position of FIG. 3 when the control system of the apparatus admits pressure fluid through the conduit 29d and permits evacuation of pressure fluid through the conduit 29e.

In order to further increase the output of the apparatus, it is often advisable to provide automatic control means which completes the electric circuit of the machine 10 and/or of the aligned mold so that the machine injects requisite quantities of plastic material as soon as a mold is moved into operative engagement with the nozzle 10a. One form of such control means is shown somewhat schematically in FIG. 3.

The carriage 28a comprises an upwardly extending arm 28b which carries the rails 28c, 28d for the rollers 16 and which also supports a substantially vertical guide sleeve 35 for a plunger 34. The plunger 34 is reciprocable in sleeve 35 by a motion transmitting spindle 40 which is pivotally connected thereto by a pin 40a and which is pivoted to a bracket 31e (forming part of the bolt 31c) by a further pivot pin 40b. The length of the spindle 40 is adjustable so that the operator may change the stroke of the plunger 34. The plunger 34 carries a pair of electrical contacts 32 (only one shown) which are biased by springs 36. This plunger actually comprises two relatively movable components 37, 37a, and the component 37 is provided with bores through which the terminals of the contacts 32 may project upwardly and into engagement with the respective contacts 33 of the mold 11Z. Each contact 32 comprises an annular flange which is engaged by the upper end of the respective spring 36, and these springs are accommodated in suitable upwardly opening recesses provided in the lower component 37a. The section through the plunger 34 of FIG. 3 is a composite section so that it also shows a coupling bolt 38 whose upper end is screwed into the component 37 and whose head is reciprocably received in a countersunk bore extending upwardly from the lower end face of the lower component 37a. The head of the bolt 38 is biased by a spring 39. The purpose of the bolt or bolts 38 is to permit limited axial movements of the component 37 with respect to the component 37a, and vice versa.

When the piston 29b is caused to move the piston rod 29a in upward direction and the carriage 28a is moved in a direction to the left (arrow G), the bracket 31e pivots about the pin 30d (arrow H) and moves the plunger 34 toward the contacts 33 of the mold 11Z. When the component 37 abuts against the receptacle 33a of the mold 11Z, the lower component 37a continues to advance in upward direction and compresses the spring or springs 39 as well as the springs 36 as soon as the contacts 32 engage with the respective contacts 33. The electric circuit of the mold 11Z which includes conductor means 42 connecting one of the contacts 32 to a current supply and conductor means 43 connecting the other of the contacts 32 to a control device (not shown in the drawing) of molding machine 10 is now completed and the injection molding operation is started in a fully automatic way. The contacts 32 are automatically separated from the contacts 33 to open the electric circuit when the piston 29b causes the bracket 31e to turn in a clockwise direction (counter to the arrow H).

The component 37 provides a protective housing for the terminals of the contacts 32 and exposes these terminals only at the time the toggle mechanism is in self-locking position.

The apparatus of FIGS. 1 to 3 may be rapidly and conveniently converted to accommodate a larger or a lesser number of molds 11 or other items. All that is necessary is to increase or to reduce the number of stations on the conveyers 14, 15 so that the overall length of the apparatus is changed but the width of the apparatus remains the same. The transfer devices 17, 18 may remain unchanged regardless of whether the apparatus comprises only three or a much larger number of molds which can exceed by far the number of molds shown in the drawings.

Another advantageous feature of the apparatus which is shown in FIGS. 1 to 3 is that the rollers 16a, 16b always remain parallel with the rollers 16. This insures that the molds are properly guided in the longitudinal direction of the conveyers 14, 15 even though the conveyers need not always be provided with side rails for the molds. In addition, since the transfer devices 17, 18 may be moved from abutment with the conveyer 14 into abutment with the conveyer 15, the means which moves these transfer devices need not be provided with damping means, complicated stops and like auxiliaries because the transfer devices are automatically arrested in requisite positions as soon as they abut the one or the other conveyer. The fluid admitted to the cylinder 20 prevents the transfer devices from rebounding on the respective ends of the conveyers so that the transfer devices are positively retained in alignment with the conveyers as soon as the flexible element 21 is brought to a halt.

It will be readily understood that the rollers 16, 16a, 16b constitute but one form of means for reducing friction between the conveyers or transfer devices and the molds 11. For example, each roller may be replaced by a large number of smaller rollers which are mounted on a common shaft, and it is equally possible to replace each roller 16 by a pair of rollers 16a, 16b.

Owing to the fact that the provision of a single flexible element 21 is sufficient for moving both transfer devices, the effective length of this single flexible element may be conveniently reduced or increased if the apparatus is to be converted for use with a larger or lesser number of molds. Alternately, the flexible element may be replaced by a shorter or longer flexible element.

Because the means for reciprocating the carriage 28a comprises a toggle mechanism which is self-locking, the cylinder 29 may be comparatively small since it need not supply the locking force when the machine 10 injects plastic material into a selected mold. The shock absorber 31 provides the necessary yieldability when a mold is caused to move into operative engagement with the machine 10. In addition, the shock absorber prevents the damage to the molds and/or to the machine 10 in the event that the mold supported by the carriage 28a is not properly aligned with the nozzle 10a.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. An apparatus for intermittently moving a plurality of molds in an endless path and for moving consecutive molds into operative engagement with an injection molding machine, said apparatus comprising, in combination, a first and a second elongated conveyer each having a first and a second end; a first and a second row of end-to-end arranged molds, said rows respectively supported by said first and second conveyors and each thereof comprising a first and a second outermost mold respectively located at the first and second ends of said first and second conveyors, said molds shiftable in the longitudinal direction of said conveyors; a first transfer device movable between the first ends of and into alignment with said first and second conveyors; a second transfer device movable between the second ends of and into alignment with said first and second conveyors; means for moving said transfer devices into alignment with said first and second conveyers; at least one mold supported by one of said transfer devices; first shifting means for transferring said one mold from said one transfer device onto said first conveyer while both of said transfer devices are in alignment with said first conveyer to shift thereby the first row of molds in one direction and to transfer thereby one of the outermost molds of said first row onto the other transfer device; second shifting means for transferring the mold from the other transfer device onto said second conveyer while both of said transfer devices are in alignment with said second conveyer to shift thereby the second row of molds in a direction opposite to said one direction and to transfer thereby one of the outermost molds of said second row onto said one transfer device; an injection molding machine adjacent to said first conveyer and aligned with a given mold of said first row when the molds of said first row are stationary; means for reciprocating said given mold in a direction substantially perpendicular to the longitudinal direction of said first conveyer into operative engagement with said machine and back into said first conveyer.

2. An apparatus as set forth in claim 1, wherein said first conveyer comprises carriage means adjacent to said machine and supporting a mold in said first row when the molds in said first row are stationary, said reciprocating means comprising fluid-operated cylinder and piston means and a toggle mechanism operatively connected with said piston means, said toggle mechanism comprising a lever articulately connected with said carriage means for reciprocating said carriage means and the mold supported by said carriage means into operative engagement with said machine and back into alignment with said first row of molds in response to reciprocation of the piston means in said cylinder means.

3. An apparatus as set forth in claim 1, wherein said given mold is one of the outermost molds in said first row.

4. An apparatus as set forth in claim 2, further comprising shock absorber means operatively connected with said lever.

5. An apparatus as set forth in claim 2, wherein said toggle mechanism is self-locking when the mold supported by said carriage means is in operative engagement with said machine.

6. An apparatus as set forth in claim 1, further comprising an electric control circuit for said molds, said control circuit comprising first contact means provided on each of said molds, second contact means provided on said reciprocating means, and means operatively connected with said reciprocating means for moving said second contact means into engagement with the contact means of the mold aligned with said machine when said reciprocating means moves said last mentioned mold into operative engagement with said machine.

7. An apparatus as set forth in claim 6, wherein at least said second contact means is biased by springs and wherein said reciprocating means comprises a toggle mechanism operatively connected with said last mentioned moving means.

8. An apparatus as set forth in claim 7, wherein said last mentioned moving means comprises guide sleeve means and plunger means reciprocably received in said sleeve means and connected with said toggle mechaism, said second contact means mounted in said plunger means.

9. An apparatus of the character described comprising, in combination, a stationary injection molding machine; conveyor means for intermittetly moving a plurality of molds in one direction along a path adjacent said injection molding machine with a given mold of said plurality of molds aligned with said injection molding machine when said plurality of molds are stationary, said conveyor means including carriage means adjacent said molding machine and supporting said given mold; and means for reciprocating said given mold in a direction substantially normal to said one direction into operative engagement with said injection molding machine and back into alignment with the remainder of said plurality of molds on said conveyor means, said reciprocating means including fluid operated cylinder and piston means and a toggle mechanism operatively connected with said piston means, said toggle mechanism comprising a lever articulately connected with said carriage means for reciprocating the latter and the mold supported thereon into operative engagement with said injection molding machine and back into alignment with the remainder of said plurality of molds in response to reciprocation of said piston means in said cylinder means.

References Cited by the Examiner

UNITED STATES PATENTS

| 2,892,214 | 6/1959 | McCarthy | 18—30 |
| 2,912,717 | 11/1959 | Yarrison et al. | 18—4 |
| 2,921,336 | 1/1960 | Crafton | 18—4 |
| 3,006,032 | 10/1961 | Baker et al. | 18—30 |
| 3,131,432 | 5/1964 | Battel et al. | 18—30 |

J. SPENCER OVERHOLSER, *Primary Examiner.*

MICHAEL V. BRINDISI, WILLIAM J. STEPHENSON, *Examiners.*